(12) United States Patent
Eichhorn et al.

(10) Patent No.: US 7,463,761 B2
(45) Date of Patent: Dec. 9, 2008

(54) SYSTEMS AND METHODS FOR CREATING AND VIEWING THREE DIMENSIONAL VIRTUAL SLIDES

(75) Inventors: Ole Eichhorn, Westlake Village, CA (US); Greg Crandall, Rancho Santa Fe, CA (US); Steven Hashagen, Albuquerque, NM (US); Dirk Soenksen, Carlsbad, CA (US); Mark Wrenn, Oceanside, CA (US)

(73) Assignee: Aperio Technologies, Inc., Vista, CA (US)

( * ) Notice: Subject to any disclaimer, the term of this patent is extended or adjusted under 35 U.S.C. 154(b) by 483 days.

(21) Appl. No.: 11/140,265

(22) Filed: May 27, 2005

(65) Prior Publication Data

US 2006/0007533 A1 Jan. 12, 2006

Related U.S. Application Data

(60) Provisional application No. 60/574,991, filed on May 27, 2004.

(51) Int. Cl.
*G06K 9/00* (2006.01)

(52) U.S. Cl. ........................ 382/133; 382/154

(58) Field of Classification Search ................. 382/108, 382/141, 154, 285, 128, 133, 134; 356/601, 356/609; 345/419–427
See application file for complete search history.

(56) References Cited

U.S. PATENT DOCUMENTS

| | | | |
|---|---|---|---|
| 3,643,015 A | 2/1972 | Davidovits et al. | |
| 4,673,988 A | 6/1987 | Jansson et al. | |
| 4,700,928 A | 10/1987 | Palcic et al. | |
| 4,742,558 A | 5/1988 | Ishibashi et al. | |

(Continued)

FOREIGN PATENT DOCUMENTS

EP 0 339 582 4/1989

(Continued)

OTHER PUBLICATIONS

Catalyurek, U et al., "The Virtual Microscope", Dec. 2003, IEEE Transactions on Information Technology in Biomedicine, vol. 7, Issue 4, pp. 230-248.*

(Continued)

*Primary Examiner*—Andrew W Johns
(74) *Attorney, Agent, or Firm*—Pattric J. Rawlins; Procopio Cory Hargreaves & Savitch LLP

(57) ABSTRACT

Systems and methods for creating and viewing three dimensional virtual slides are provided. One or more microscope slides are positioned in an image acquisition device that scans the specimens on the slides and makes two dimensional images at a medium or high resolution. This two dimensional images are provided to an image viewing workstation where they are viewed by an operator who pans and zooms the two dimensional image and selects an area of interest for scanning at multiple depth levels (Z-planes). The image acquisition device receives a set of parameters for the multiple depth level scan, including a location and a depth. The image acquisition device then scans the specimen at the location in a series of Z-plane images, where each Z-plane image corresponds to a depth level portion of the specimen within the depth parameter.

11 Claims, 5 Drawing Sheets

U.S. PATENT DOCUMENTS

| | | | |
|---|---|---|---|
| 4,744,642 A | 5/1988 | Yoshinaga et al. | |
| 4,760,385 A | 7/1988 | Jansson et al. | |
| 4,777,525 A | 10/1988 | Preston et al. | |
| 4,845,552 A | 7/1989 | Jaggi et al. | |
| 4,960,999 A | 10/1990 | McKean et al. | |
| 5,086,477 A | 2/1992 | Yu et al. | |
| 5,187,754 A | 2/1993 | Currin et al. | |
| 5,231,663 A | 7/1993 | Earl et al. | |
| 5,400,145 A | 3/1995 | Suita et al. | |
| 5,412,214 A | 5/1995 | Suzuki et al. | |
| 5,495,535 A | 2/1996 | Smilansky et al. | |
| 5,578,832 A | 11/1996 | Trulson et al. | |
| 5,633,948 A | 5/1997 | Kegelmeyer, Jr. | |
| 5,644,356 A | 7/1997 | Swinson et al. | |
| 5,672,861 A | 9/1997 | Fairley et al. | |
| 5,710,835 A | 1/1998 | Bradley | |
| 5,714,756 A | 2/1998 | Park et al. | |
| 5,790,710 A | 8/1998 | Price et al. | |
| 5,793,969 A | 8/1998 | Kamentsky et al. | |
| 5,796,861 A | 8/1998 | Vogt | |
| 5,834,758 A | 11/1998 | Trulson et al. | |
| 5,872,591 A | 2/1999 | Truc et al. | |
| 5,912,699 A | 6/1999 | Hayenga et al. | |
| 5,922,282 A | 7/1999 | Ledley | |
| 5,943,122 A | 8/1999 | Holmes | |
| 5,963,314 A | 10/1999 | Worster et al. | |
| 5,968,731 A | 10/1999 | Layne et al. | |
| 5,991,444 A | 11/1999 | Burt et al. | |
| 5,999,662 A | 12/1999 | Burt et al. | |
| 6,002,789 A | 12/1999 | Olsztyn et al. | |
| 6,005,964 A | 12/1999 | Reid et al. | |
| 6,049,421 A | 4/2000 | Raz et al. | |
| 6,055,097 A * | 4/2000 | Lanni et al. | 359/386 |
| 6,078,681 A | 6/2000 | Silver | |
| 6,091,846 A | 7/2000 | Lin et al. | |
| 6,101,265 A | 8/2000 | Bacus et al. | |
| 6,272,235 B1 * | 8/2001 | Bacus et al. | 382/133 |
| 6,327,377 B1 | 12/2001 | Rutenberg et al. | |
| 6,330,348 B1 | 12/2001 | Kerschmann et al. | |
| 6,396,941 B1 | 5/2002 | Bacus et al. | |
| 6,438,268 B1 | 8/2002 | Cockshott et al. | |
| 6,519,357 B2 | 2/2003 | Takeuchi | |
| 6,711,283 B1 | 3/2004 | Soenksen | |
| 6,714,281 B1 | 3/2004 | Amano et al. | |
| 2001/0013960 A1 * | 8/2001 | Popovich et al. | 359/15 |
| 2002/0001089 A1 * | 1/2002 | Price | 356/601 |
| 2002/0071125 A1 * | 6/2002 | Sieckmann | 356/609 |
| 2002/0090127 A1 * | 7/2002 | Wetzel et al. | 382/133 |
| 2002/0114497 A1 | 8/2002 | Wetzel et al. | |
| 2003/0095700 A1 * | 5/2003 | Yu et al. | 382/154 |
| 2003/0184730 A1 * | 10/2003 | Price | 356/39 |
| 2003/0215936 A1 * | 11/2003 | Kallioniemi et al. | 435/287.1 |
| 2003/0222197 A1 * | 12/2003 | Reese et al. | 250/206 |
| 2004/0004614 A1 * | 1/2004 | Bacus et al. | 345/419 |
| 2004/0257360 A1 * | 12/2004 | Sieckmann et al. | 345/419 |

FOREIGN PATENT DOCUMENTS

| | | | |
|---|---|---|---|
| WO | 98/39728 | | 9/1998 |
| WO | 98/44446 | | 10/1998 |
| WO | WO 2004/008218 | * | 1/2004 |
| WO | WO 2006/023675 | * | 3/2006 |

OTHER PUBLICATIONS

Kawaji, A., "3D attitude control system for bio-micromanipulation", Sep. 9-12, 2001, Micromechatronics and Human Science, 2001. MHS 2001. Proceedings of 2001 International Symposium on, pp. 197-202.*

Hamilton, eric, "JPEG File Interchange Format" Version 1.02, Sep. 1, 1992; C-Cube Microsystem, Milpitas, CA.

Adobe Developers Association, "TIFF" Revision 6.0, Jun. 3, 1992; Adobe Systems Incorporated, Mountain View, CA.

* cited by examiner

SYSTEMS AND METHODS FOR CREATING AND VIEWING THREE DIMENSIONAL VIRTUAL SLIDES

RELATED APPLICATION

The present application claims the benefit of U.S. provisional patent application Ser. No. 60/574,991 filed on May 27, 2004, which is incorporated herein by reference in its entirety.

BACKGROUND

1. Field of the Invention

The present invention generally relates to creating and viewing virtual microscope slide images and more particularly relates to the creating and viewing of three dimensional virtual microscope slide images.

2. Related Art

Conventional microscopes, using mechanical focusing mechanisms of sufficient quality, are easily focused by an observer. The feedback loop between the eye/brain and the fingers is extremely rapid and accurate. If any part of the feedback loop is impaired, however, the process of obtaining perfect focus becomes extremely difficult, time consuming and even inaccurate. These impairments may arise from poor optical quality, insufficient or incorrect illumination, inaccuracies in the focusing mechanism, or even due to poor visual acuity of the operator.

More recently, conventional computer implemented microscope systems have provided the ability to remotely access high resolution images of microscope slides for a number of years. Devices capable of creating such images fall into two broad categories: (1) remote controlled (or robotic) microscopes; and (2) imagers, which create some type of electronic or photographic image of some, or all, of the specimen. Each type has its advantages and disadvantages, many of which are unique to the particular application.

Remote controlled microscopes, which essentially replace the operator's eye with an electronic camera, allow the operator to control the focus plane of the camera. This capability is particularly advantageous when viewing thick specimens. However, the optical field of view at moderate or high resolution is extremely small due to a limited number of camera pixels. This makes it very difficult and time consuming to view an entire specimen on a microscope slide even at moderate magnification.

Conventional imaging systems are capable of creating large enough images to capture an entire specimen at moderate or high magnification. These images are called virtual microscope slides or virtual slides. Because of their extremely large size, virtual slides are usually limited to a single focus level ("Z-plane"). Many types of microscope specimens are very thin so a single Z-plane virtual slide is sufficient. Other types of microscope specimens, however, are thicker than the depth of field of the objective lens.

Remote controlled microscopes additionally suffer from an even more degrading effect—time lag. Because a remotely controlled microscope is merely a microscope with motorized stages for positioning and focusing the specimen, and a camera to transmit images to a remote user, if the image being displayed to the user is delayed by even a small fraction of a second, the feedback loop will be frustrating, if not nearly impossible to use. The user, viewing the electronic image on a remote monitor, will attempt to converge on the optimally focused image, only to find that the image continues to zoom after he has attempted to stop at the best focus. The process must then be repeated in smaller and smaller iterations, at slower and slower speeds until finally, a satisfactory focus is obtained. Time lag in conventional systems, in particular as it applies to a networked attached device making use of an internet connection, has several contributing causes. One cause can be traced to the design of the device itself. Poor system design, and inefficient data processing methods can add significantly to the perceived sluggishness of conventional systems.

Two other factors are more serious in that they cannot always be controlled by the designer. The first is bandwidth. Bandwidth refers to the capacity of a network to transmit data, or in the case of a robotic microscope, the imagery being displayed to the operator, and the control signals returning to the device to affect its position and focus. Low network bandwidth limits the update rate of the image on the video display. Fortunately, increased bandwidth may be purchased at greater expense, effectively solving this problem. The second problem, called latency, is not so easily solved. Latency is simply the delay time between network nodes. Even fast networks have some degree of latency. Delays, often on the order of seconds, are not uncommon over the Internet. Latency is the Achilles heel of real-time feedback control systems.

What is needed is a remote device that appears to the user as an extremely responsive, high bandwidth, low latency, remote controlled microscope that does not suffer from the limitations of the conventional systems described above.

SUMMARY

Accordingly, certain embodiments are described herein that provide systems and methods that allow users to locally or remotely interact with a microscope slide image acquisition device or image data server device for responsive, high bandwidth, low latency acquisition and viewing of virtual slide images in multiple Z-planes. The systems and methods described herein combine the advantages of remote controlled microscopes and microscope imaging systems and provide the ability to scan large regions of a specimen on a microscope slide at high resolution, as well as the ability for an operator to quickly view selected areas of interest and control the focus depth within a thick specimen.

One aspect of the invention is a computer implemented method for creating and viewing three dimensional virtual microscope slides. A microscope slide is positioned in an image acquisition device that is capable of scanning the slide to create a digital image of the specimen on the slide. The specimen is then scanned into a two dimensional image at a medium or high resolution. This two dimensional image is provided to an image viewing workstation where it can be reviewed by an operator. The operator can pan and zoom the two dimensional image at the image viewing workstation and select an area of interest for scanning at multiple depth levels (Z-planes). The image acquisition device receives a set of Z-stack parameters including a location and a depth and then scans a series of Z-plane images, where each Z-plane image corresponds to a portion of the specimen within the depth parameter.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for systems and methods for creating and viewing three dimensional virtual slides. For example, one method as disclosed herein allows for one or more microscope slides to be positioned in an image acquisition device that scans the specimens on the slides and makes two dimensional images at a medium or high resolution. Alternatively, the entire specimens can be captured at once in a low resolution "macro" image. These high or low resolution two dimensional images are provided to an image viewing workstation where they are viewed by an operator who pans and zooms the two dimensional image and selects an area of interest for scanning at multiple depth levels (Z-planes). The image acquisition device receives a set of parameters for the multiple depth level scan, including a location and a depth. The image acquisition device then scans the specimen at the location in a series of Z-plane images, where each Z-plane image corresponds to a depth level portion of the specimen within the depth parameter. After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
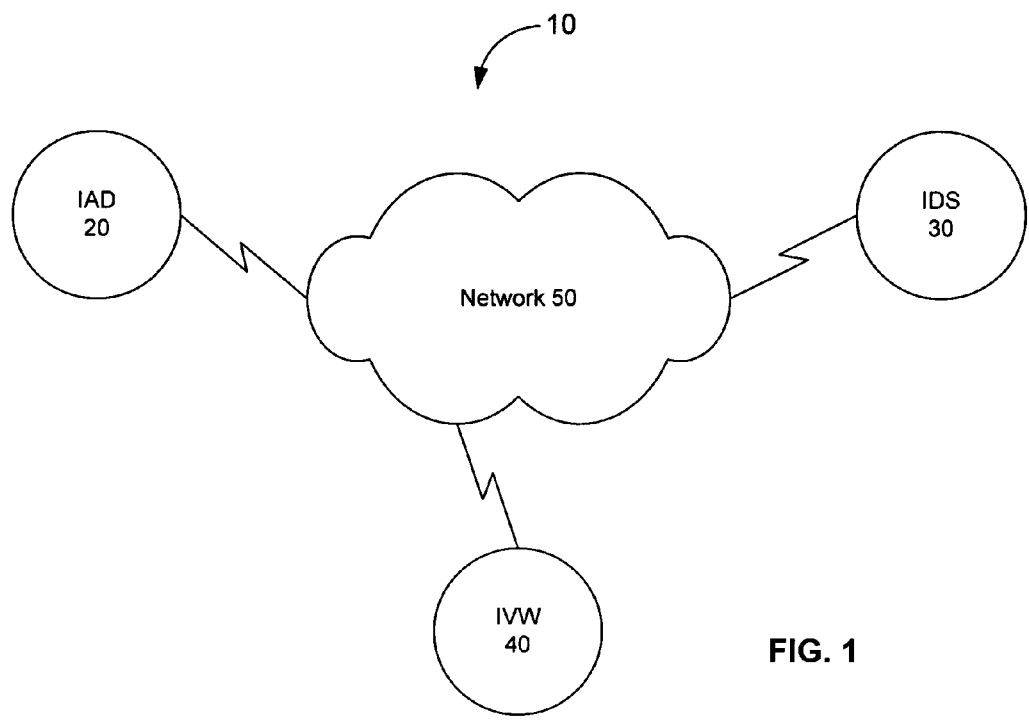
FIG. 1 is a block diagram illustrating an example networked system according to an embodiment of the present invention.

FIG. 1 is a block diagram illustrating an example networked system 10 according to an embodiment of the present invention. In the illustrated embodiment, the system 10 comprises an image acquisition device ("LAD") 20, an image data server ("IDS") 30, and an image viewing workstation ("IVW") 40. Each of these devices is associated with a respective data storage area 25, 35, and 45, and each of the devices is communicatively coupled to the others via a network 50. Alternatively, the devices may be directly connected to each other or connected to each other via separate networks. In one embodiment, two or more of the devices may be modularly integrated into the same physical device, in which case the communication between functional modules may take place through inter-process communication, shared memory, common files or the like.

The IAD 20 comprises hardware and software which can acquire two-dimensional images from microscope slides. The IAD 20 may acquire images from the slide at any location within the slide (X,Y) and at any focal depth (Z).

FIG. 1 is a block diagram illustrating an example networked system 10 according to an embodiment of the present invention. In the illustrated embodiment, the system 10 comprises an image acquisition device ("IAD") 20, an image data server ("IDS") 30, and an image viewing workstation ("IVW") 40. Each of these devices is associated with a respective data storage area 25, 35, and 45, and each of the devices is communicatively coupled to the others via a network 50. Alternatively, the devices may be directly connected to each other or connected to each other via separate networks. In one embodiment, two or more of the devices may be modularly integrated into the same physical device, in which case the communication between functional modules may take place through inter-process communication, shared memory, common files or the like.

Specimens on a microscope slide usually have an overall dimension of between 10 and 30 mm per side. For example, a typical sample could cover a region of 20×15 mm. Such a sample, when imaged fully at a resolution of 0.25 microns per pixel (i.e., 40×), yields an image that has 80,000×60,000 pixels. Accurately obtaining full slide images is technically difficult, but may be accomplished with instruments such as the Aperio ScanScope® that is described in detail in U.S. Pat. No. 6,711,283 (Soenksen), which is incorporated herein by reference in its entirety.

The IDS 30 comprises a server computer and software which stores and enables access to two- and three-dimensional images acquired by the IAD. The IDS can be located near the IAD 20 on a local-area network. In an alternative embodiment it may be desirable for the IDS 30 to be remote from the IAD 20 and connected via a wide-area network.

The IVW 40 comprises a personal computer and software which can display two and three dimensional images acquired by the IAD 20 and retrieved from the IDS 30. The IVW 40 may be located across a local area network or wide area network from the IAD 20 and IDS 30, using standard computer network technology such as TCP/IP. The user at an IVW 40 directs the IAD 20 to capture image data of the specimen on a microscope slide, and views it interactively. The captured image data are stored on the IDS 30, from which they may be later viewed using an IVW 40.

The network 50 may be a local area network, a wide area network, a wired or wireless network, or any combination of networks. On such combination of networks is commonly referred to as the Internet. Network 50 may be the Internet or any sub-combination of the networks that comprise the Internet. Network 50 may also be a private network or a public network or any combination of networks.

Figure 2:
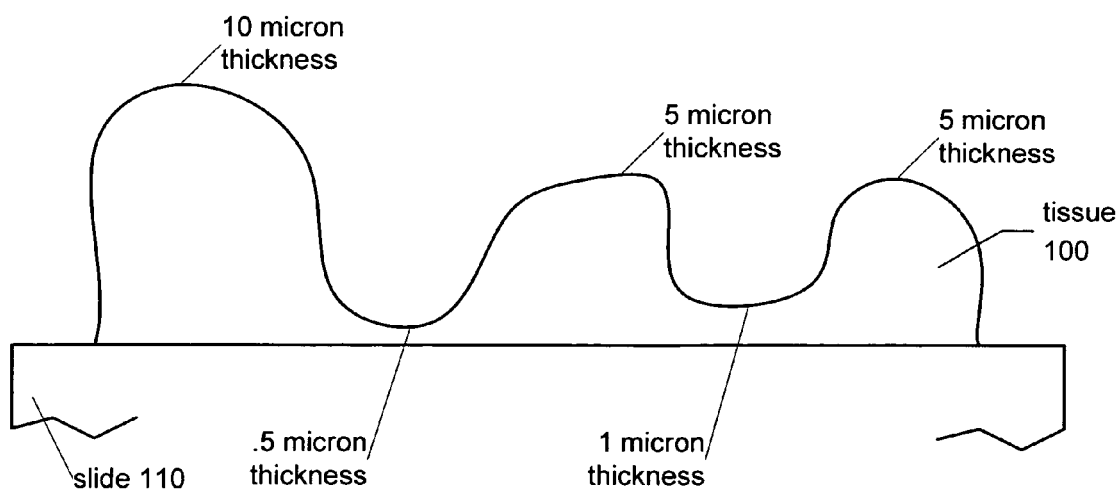
FIG. 2 is a side view of an example microscope slide with a specimen according to an embodiment of the present invention.

FIG. 2 is a side view of an example microscope slide with a specimen according to an embodiment of the present invention. In the illustrated embodiment, the slide 110 supports a sample of tissue 100 (also referred to herein as a specimen).

The tissue 100 may be any type of microscope slide specimen such as blood or other substances.

Although tissue samples such as tissue 100 on a microscope slide appear flat, at the micron and sub-micron resolution level they actually have a considerable amount of variation in thickness. The thickness of samples can vary from 0.5 micron to 10 microns. In some cases it is medically important to view samples three-dimensionally, by focusing the 0.5/1.0 micron focal depth through the specimen, e.g., an area of a specimen that is 10 microns thick. This is typically accomplished by capturing multiple images at the same location on the specimen but at varying focal depths. A set of images acquired from one location on the specimen at different focus depths is called a "Z-stack" and each individual image in the Z-stack is called a "Z-plane."

Figure 3:
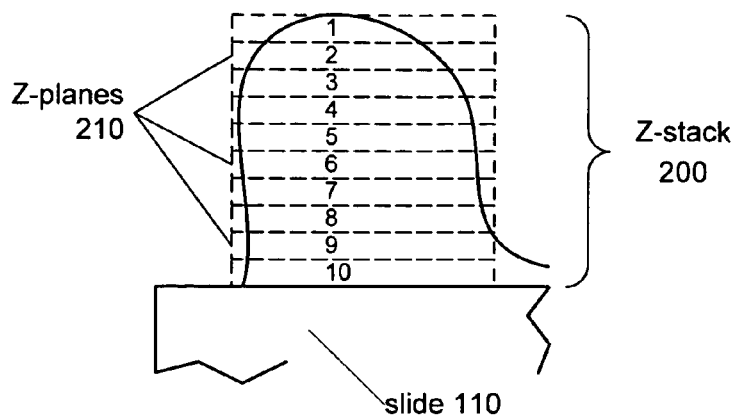
FIG. 3 is a block diagram illustrating an example three dimensional Z-stack according to an embodiment of the present invention.

FIG. 3 is a block diagram illustrating an example three dimensional Z-stack 200 according to an embodiment of the present invention. In the illustrated embodiment, the Z-stack 200 is taken from a location on the specimen that is 10 microns thick (see corresponding area in FIG. 2). In the illustrated embodiment, the Z-stack 200 comprises 10 Z-planes 210. In this particular embodiment, the focus depth of the objective lens is 1 micron so that 10 contiguous Z-planes are captured and collectively cover the entire 10 micron thickness of the specimen.

In alternative embodiments, the depth of a single Z-plane may be more or less than 1 micron and the various Z-planes maybe be spaced apart rather than being contiguous.

The lateral (X,Y) dimensions of each Z-plane image in a Z-stack are typically determined by the acquisition hardware, such as the size of a camera's CCD array. In one embodiment the dimensions of the CCD array may be 2048×1536 pixels. A Z-plane image may also be a combination of several fields of view combined together. The number and spacing of the images in a Z-stack are configurable, and dependent upon the sample type and nature of the medical application. In one embodiment, a typical Z-stack contains 5-10 images spaced 0.25-1.0 micron apart.

Figure 4:
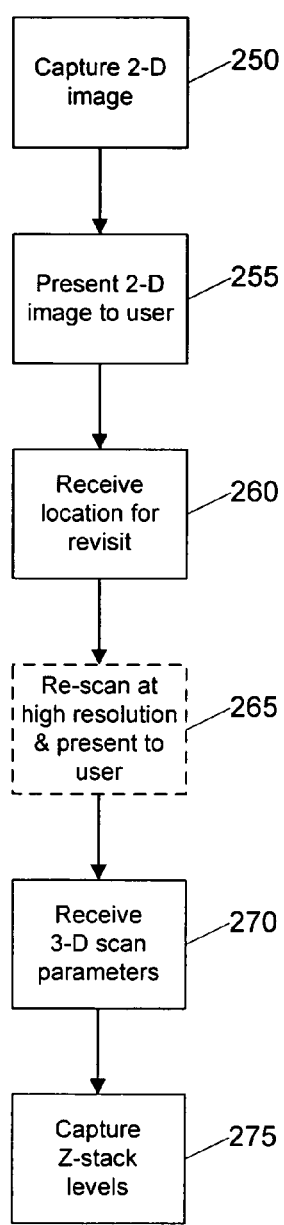
FIG. 4 is flow diagram illustrating an example high level process for creating a three dimensional virtual microscope slide according to an embodiment of the present invention.

FIG. 4 is flow diagram illustrating an example high level process for creating a three dimensional virtual microscope slide according to an embodiment of the present invention. This procedure may be carried out by the system shown and described with respect to FIG. 1. Initially, in step 250 the IAD captures a two dimensional image of the specimen on the microscope slide. Next, in step 255 this image is presented to a user of the UVW. The imagery data going to the IVW may route through the IDS where the imagery data are first stored as a virtual slide or portion of a virtual slide, then presented to the user.

The user may pan and zoom and otherwise review the two dimensional image(s) via the IVW to identify an area of interest for three dimensional image capture. In step 260, the IAD receives a location to revisit for three dimensional image capture. In one embodiment, the IVW sends the location information directly to the IAD. At this point, in step 265, the IAD may optionally rescan the identified location at a higher resolution and then present the higher resolution area to the user for review. For example, in one embodiment, the initial two dimensional scan may be a low resolution scan that requires a review at a higher resolution prior to a decision being made about whether to capture a Z-stack at that location. Alternatively, the initial scan may be at a sufficiently high resolution (e.g., 20×) to make that determination. In such an alternative embodiment, optional step 265 can be skipped.

Next, the IAD receives three dimensional scan parameters, as illustrated in step 270. These parameters may include length and width identifiers that uniquely describe a region of the specimen in coordinates that relate to the stage of the IAD upon which the microscope slide sits. Other parameters may also include the number of Z-planes desired in the Z-stack. Additionally, the parameters may include the desired spacing between Z-planes in the Z-stack. Additional information may also include the desired scanning resolution (e.g., 20×, 40×, 100×). Other parameters may also be provided.

Finally, in step 275 the IAD captures the various Z-planes in the Z-stack. These Z-planes can then be sent to the IDS for storage along with the two dimensional image as part of the same virtual slide. In one embodiment, the capturing of the Z-stack proceeds down the Z-plane levels as shown in FIG. 3. For example, the IAD may first capture Z-plane 1 and then move the objective lens relative to the stage (or vice-versa) and capture Z-plane 2 and so forth until all of the Z-planes in the Z-stack have been captured.

Figure 5:
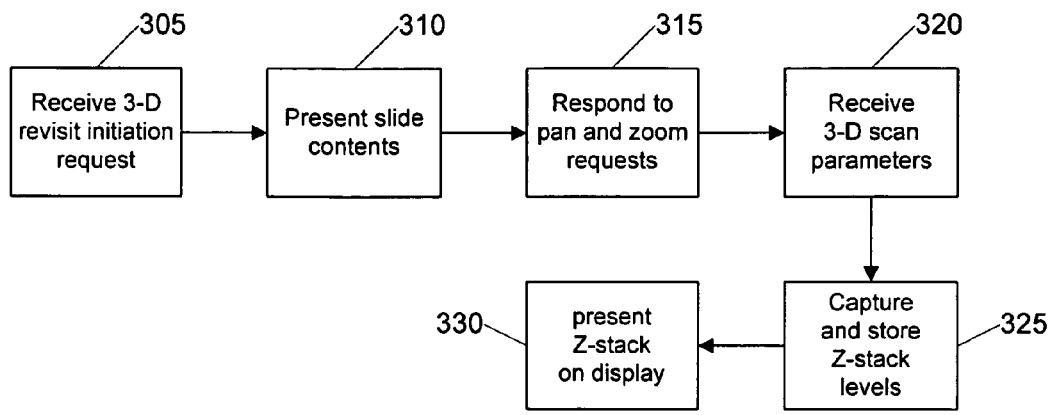
FIG. 5 is a flow diagram illustrating an example process for creating a three dimensional virtual microscope slide according to an embodiment of the present invention.

FIG. 5 is a flow diagram illustrating an example process for creating a three dimensional virtual microscope slide according to an embodiment of the present invention. This procedure may be carried out by the system shown and described with respect to FIG. 1. Initially, in step 305 the IVW receives an instruction to initiate a "revisit" three dimensional scan. The IVW next, in step 310, obtains and presents the contents of the subject virtual slide to the user. This may be done through interactions directly with the IAD or it may be achieved through interactions with the IDS or both. After providing the user with the virtual slide for viewing, the IVW then works together with the IDS to respond to pan and zoom requests in step 315 as the user views the specimen in the virtual slide. Next, in step 320, the IVW receives the three dimensional scan parameters and sends the parameters to the IAD. The three dimensional scan parameters may include the location of the area to be revisited for Z-stack capture, the length and width of the area, the number of Z-planes to be captured in the Z-stack, the spacing between Z-planes in the Z-stack, the resolution of the Z-plane images, and the total depth of tissue to be included in the Z-stack, just to name a few. Additional parameters may also be provided to increase the accuracy and sufficiency of the Z-stack to be scanned.

Next, in step 320, the IAD captures the Z-plane images in the Z-stack and sends the images in the Z-stack to the IDS for storage as part of the virtual microscope slide. The IDS, in turn, may then send the Z-stack imagery data to the IVW as part of the virtual slide where it is presented as a Z-stack to the user, as shown in step 330.

Figure 6:
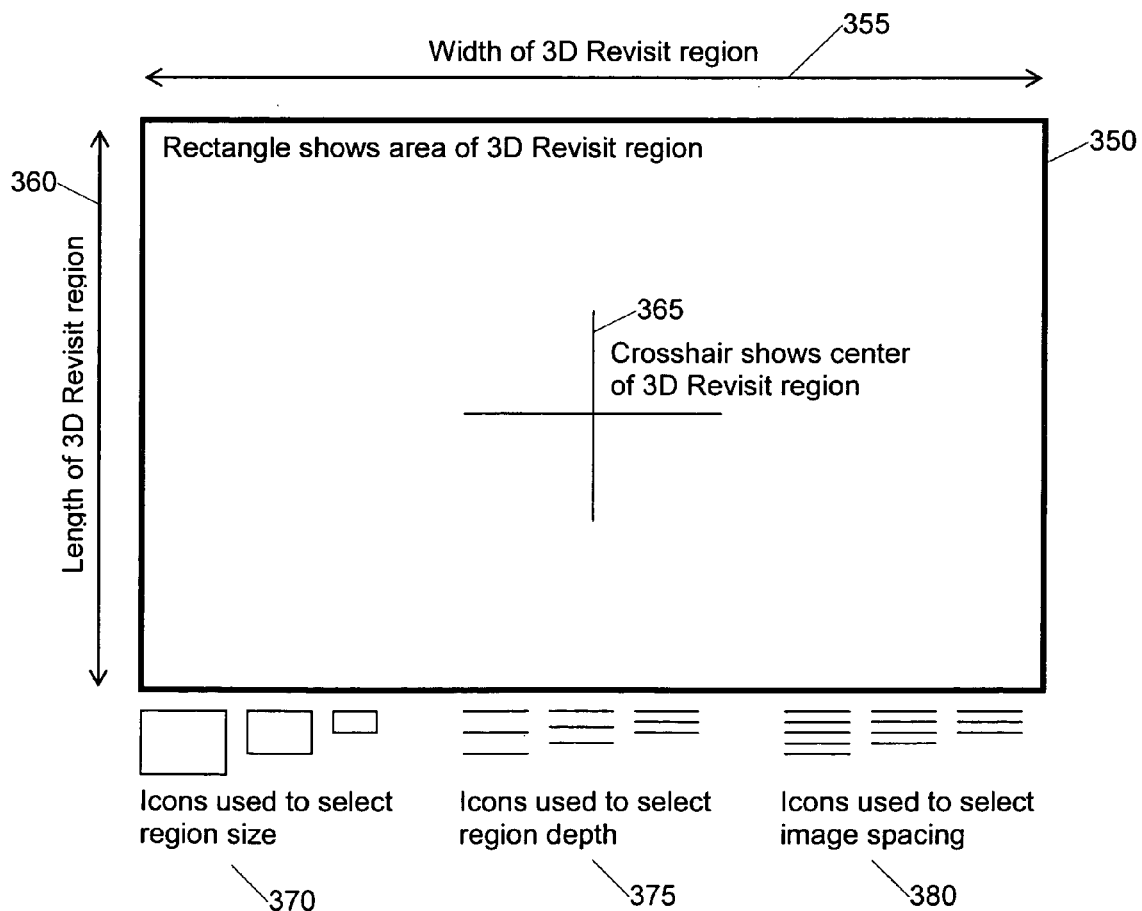
FIG. 6 is a block diagram illustrating an example user interface for creating a three dimensional virtual slide according to an embodiment of the present invention.

FIG. 6 is a block diagram illustrating an example user interface for creating a three dimensional virtual slide according to an embodiment of the present invention. In the illustrated embodiment, a rectangular area 350 is shown that comprises an area of a specimen on a microscope to be revisited for three dimensional image capture. The rectangular area has a length 360 and a width 355, and a crosshair 365 that identifies the location of the center of the region to be scanned into a Z-stack. In one embodiment, the user may drag the rectangle using a mouse on the screen of the IVW to specify the area of interest. After the rectangle is created by the user, the IVW may calculate the actual length and width and location for the area to be scanned into a Z-stack. These parameters may then be sent to the IAD for to facilitate image capture for the Z-stack.

Additionally, in the illustrated embodiment the user is presented with a selection of icons 370, 375, and 380 that be used to select the size of the rectangular region 350, to select the depth of the region to be scanned into the Z-stack, and to select the spacing between individual Z-planes in the Z-stack. Advantageously, these selections by the user can also be sent to the IAD as parameters for facilitating image capture for the Z-stack. Alternative user interfaces may also be employed to carry out the function of user interaction for identifying an area of interest to scan into a Z-stack.

Figure 7:
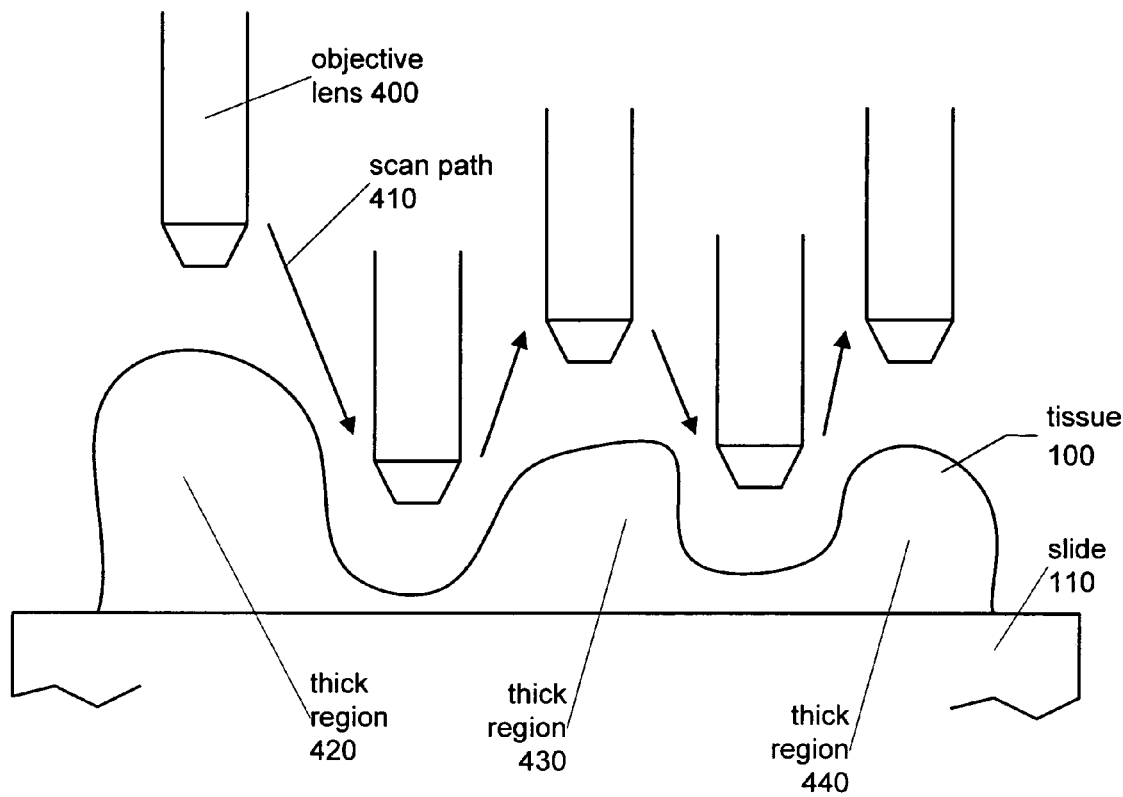
FIG. 7 is a block diagram illustrating an example scan path for an image acquisition device over a specimen having varying thickness according to an embodiment of the present invention.

FIG. 7 is a block diagram illustrating an example scan path for an image acquisition device over a specimen having varying thickness according to an embodiment of the present invention. In the illustrated embodiment, an objective lens 400 is shown over a tissue sample 100 on a microscope slide 110. The objective lens, when scanning the tissue 100 travels along a scan path 410 and passes over the tissue 100. The tissue 100 may be highly uneven (e.g., as seen through a 40× objective lens at the micron level) and comprises several thick regions 420, 430, and 440. For purposes of this example, the thick region 420 is 10 microns, the thick region 430 is 5 microns, and the thick region 440 is also 6 microns. These thick regions are separated by valleys in the tissue that are not thick and, for example, are 0.5 microns thick and 1 micron thick.

Figure 8:
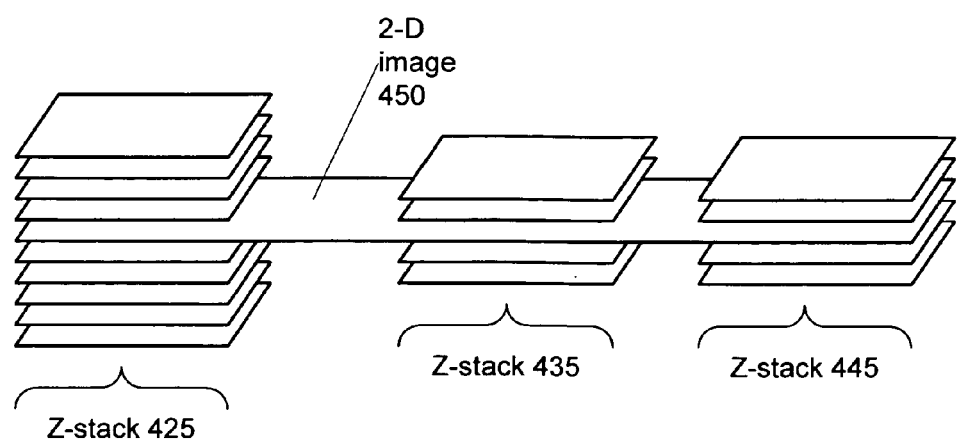
FIG. 8 is a block diagram illustrating an example three dimensional virtual slide that results from a three dimensional scan of the specimen shown in FIG. 7 according to an embodiment of the present invention.

During the initial scan of the tissue 100, a two dimensional image is created. This two dimensional image is shown as image 450 in FIG. 8. FIG. 8 is a block diagram illustrating an example three dimensional virtual slide that results from a three dimensional scan of the tissue 100 shown in FIG. 7 according to an embodiment of the present invention. Also shown in FIG. 8 are the resulting Z-stacks 425, 435, and 445, each of which have a plurality of Z-planes such as Z-planes 460.

Z-stack 425 corresponds to thick region 420 and comprises 10 Z-planes. In this example, the objective lens 400 has a focus depth of 1 micron so that 10 contiguous Z-planes 460 cover the entire thickness of the region 420. Z-stack 435 corresponds to thick region 430 and similarly comprises 5 Z-planes. Z-stack 445 corresponds to thick region 440 and also comprises 5 Z-planes.

In the illustrated embodiment shown in FIG. 8, the Z-plane corresponding to the two dimensional image 450 is located in the middle of each of the Z-stacks. This is because when the example Z-stacks were captured, the middle depth of the Z-stack was set for the same depth at which the initial two dimensional image 450 was captured. Accordingly, to arrive at the virtual slide shown in FIG. 8, an initial two dimensional image 450 was captured by the IAD, the user identified thick regions 420, 430, and 440 for Z-stack capture, and when the IAD captured those Z-stacks, the depth level of the Z-plane in the middle of the Z-stack was set at the same level at which the two dimensional image was captured.

In alternative embodiments, the various Z-planes of a Z-stack may all be set below the depth level of the original two dimensional image. Alternatively, the various Z-planes of a Z-stack may all be set above the depth level of the original two dimensional image. Various different calibrations may also be used for the planes in a Z-stack in order to optimize the capture of imagery data of actual tissue for inclusion in the virtual slide image.

Figure 9:
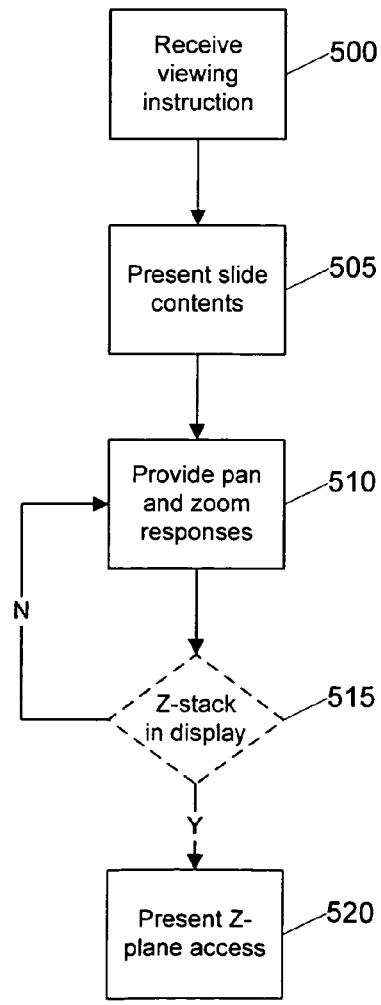
FIG. 9 is a flow diagram illustrating an example process for viewing three dimensional virtual slides according to an embodiment of the present invention.

FIG. 9 is a flow diagram illustrating an example process for viewing three dimensional virtual slides according to an embodiment of the present invention. This procedure may be carried out by the system shown and described with respect to FIG. 1 and in one embodiment may only require the IDS and IVW devices. Initially, in step 500 the IDS receives a viewing instruction from the IVW. In response, the IDS obtains the requested virtual slide from a data storage area (could be local or remote) and provides the virtual slide to the IVW. Next, in step 505 the IVW presents the virtual slide imagery data to the user. Note that although the virtual slide is presented to the user via the IVW, only a subset of the entire virtual slide imagery data is presented at any time. For example, a thumbnail image of the entire virtual slide may be presented simultaneously with one or two additional views of the imagery data at different resolutions.

Once the virtual slide is being presented to the user, the IVW and IDS work in concert to respond to pan and zoom commands from the user, as shown in step 510. This allows the user to view all areas of the specimen at low and high magnification and importantly at a diagnostic resolution. During the pan and zoom interaction with the user, the IVW and IDS monitor the areas of the specimen that are being viewed by the user. When an area of the specimen that includes a Z-stack is being viewed, as determined in step 515, the IVW provides the user with access to the Z-plane images of the Z-stack, as shown in step 520.

In one embodiment, the user may be notified of the presence of a Z-stack by a visual cue. For example, the imagery data may be supplemented with an overlay that identifies a Z-stack or a new menu may appear or an informational window may pop-up to notify the user that a Z-stack is present. Many other notification schemes may also be employed.

Advantageously, when a user encounters a Z-stack, the IVW may provide the user with the ability to select each Z-plane in the Z-stack for individual viewing. Furthermore, intermediate focus depth levels can be interpolated by the IVW to provide the user with continuous imagery data for the entire specimen in the area of the Z-stack. Accordingly, although a finite number of Z-plane images are captured as part of the Z-stack, the user can zoom through a nearly infinite number of focus depths. This ability provides the user with the complete ability to examine a specimen as if using a conventional microscope.

Figure 10:
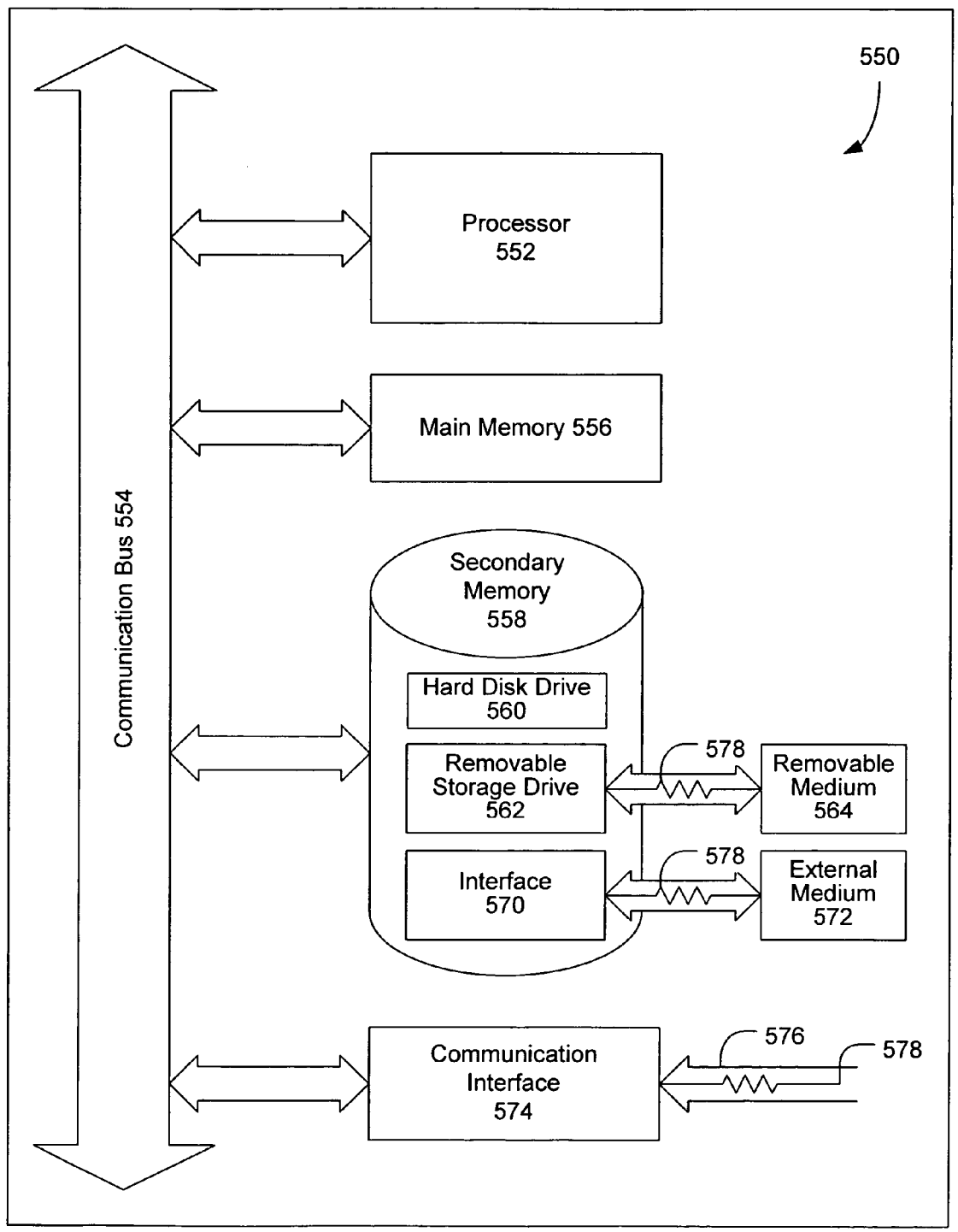
FIG. 10 is a block diagram illustrating an exemplary computer system as may be used in connection with various embodiments described herein.

FIG. 10 is a block diagram illustrating an exemplary computer system 550 that may be used in connection with the various embodiments described herein. For example, the computer system 550 may be used in conjunction with an image acquisition device, an image data server, or an image viewing workstation. However, other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A system for creating and viewing three dimensional virtual microscope slides, comprising:
    an image acquisition device configured to scan a microscope slide and create a digital image of a specimen on the microscope slide;
    an image data server communicatively coupled with the image acquisition device, the image data server configured to receive virtual microscope slide images from the image acquisition device, store the virtual microscope slide images, and provide the virtual microscope slide images upon request;
    an image viewing workstation communicatively coupled with the image acquisition device and the image data server, the image viewing workstation configured to display a two dimensional image of a specimen on a microscope slide in the image acquisition device, receive commands from an operator, and in cooperation with the image data server, allow the operator to pan said two dimensional image;
    the image viewing workstation further configured to receive a set of three dimensional scan parameters from the operator, said set including location, length, width, depth, number of Z-planes, and spacing between Z-planes and in response to receiving said parameters, instruct the image acquisition device to capture a Z-stack of images corresponding to said parameters from the specimen on the microscope slide;
    wherein the image data server is further configured to store said Z-stack of images with said two dimensional image to create a three dimensional virtual microscope slide.

2. The system of claim 1, wherein the image viewing workstation further comprises a Z-plane access module configured to present to a user one or more Z-plane images of a Z-stack in response to a request from the user for said one or more Z-plane images.

3. The system of claim 2, wherein the image viewing workstation integrates the display of one or more Z-plane images of a Z-stack into the display of a two dimensional view of the entire slide.

4. The system of claim 1, wherein the instruction from the image viewing workstation to the image acquisition device includes a set of three dimensional scan parameters comprising length, width and depth.

5. The system of claim 4, wherein the set of three dimensional scan parameters further comprises a number of Z-planes and a spacing between Z-planes.

6. A computer implemented method for creating and viewing three dimensional virtual microscope slides, comprising:
    orienting a microscope slide on a stage of an image acquisition device configured to scan the microscope slide and create a digital image of a specimen on the microscope slide;
    scanning a first two dimensional image of the specimen at a first resolution;
    providing the two dimensional image to an image viewing device;
    receiving a set of revisit parameters from the image viewing device, the set of revisit parameters comprising a first location;
    scanning a second two dimensional image of the specimen at the first location at a second resolution that is higher than the first resolution;
    providing the second two dimensional image to the image viewing device;
    receiving a set of three dimensional scan parameters from the image viewing device, the set of revisit parameters comprising a length, width, and depth;
    scanning a three dimensional Z-stack in accordance with the length, width, and depth, the Z-stack comprising a plurality of Z-plane images, each Z-plane image corresponding to a portion of the specimen in said depth; and
    storing the two dimensional image and the three dimensional Z-stack together as a three dimensional virtual microscope slide.

7. The method of claim 6, further comprising presenting the three dimensional virtual microscope slide on the display of an image viewing workstation.

8. The method of claim 7, further comprising presenting one or more Z-plane images of a Z-stack on the display of the image viewing workstation in response to a request for said one or more Z-plane images.

9. The method of claim 8, further comprising integrating the presentation of one or more Z-plane images of a Z-stack into the presentation of a two dimensional view of the entire slide.

10. A system for creating and viewing three dimensional virtual microscope slides, comprising:
    an image acquisition device configured to scan a microscope slide and create a digital image of a specimen on the microscope slide, wherein portions of said digital image comprise a Z-stack including a plurality of images from the specimen that create a three dimensional virtual microscope slide;

an image data server communicatively coupled with the image acquisition device, the image data server configured to receive a three dimensional virtual microscope slide from the image acquisition device, store the three dimensional virtual microscope slide, and provide image data from the three dimensional virtual microscope slide upon request;

an image viewing workstation communicatively coupled with the image acquisition device and the image data server, the image viewing workstation configured to interpolate and display an image at a first focus depth level in a Z-stack, wherein said first focus depth level does not correspond to the focus depth level of any of the plurality of images in the Z-stack.

11. A computer implemented method for creating and viewing three dimensional virtual microscope slides, comprising:

scanning a two dimensional image of a specimen at a high resolution;

receiving a set of three dimensional scan parameters comprising length, width, and depth;

scanning a three dimensional Z-stack in accordance with the length, width, and depth, the Z-stack comprising a plurality of Z-plane images wherein each Z-plane image corresponds to a portion of the specimen in said depth;

combining the two dimensional image and the Z-stack to form a three dimensional virtual microscope slide image;

storing the three dimensional virtual microscope slide;

interpolating a first Z-plane image that does not correspond to any Z-plane image in the Z-stack; and providing the first Z-plane image to an image viewing device.

* * * * *